United States Patent [19]

Nessler, deceased et al.

[11] 4,086,017

[45] Apr. 25, 1978

[54] DEVICE FOR LOCATING PIANO HAMMERS FOR DRILLING

[76] Inventors: Charles A. Nessler, deceased, late of Carnegie, Pa.; by Mary M. Mulhern, executrix, 221 Greenway Rd., Ridgewood, N.J. 07450

[21] Appl. No.: 793,040

[22] Filed: May 2, 1977

[51] Int. Cl.² ............................................. B23B 47/28
[52] U.S. Cl. ................................ 408/89; 408/115 R; 144/93 R; 145/129; 269/60; 269/71
[58] Field of Search ................ 408/108, 109, 89, 112, 408/115 R, 58; 144/93, 106, 92; 145/129; 269/60, 71

[56] References Cited

U.S. PATENT DOCUMENTS

| 1,103,507 | 7/1914 | Hale | 408/89 |
| 1,246,005 | 11/1917 | Parsons | 408/89 |
| 1,530,566 | 3/1925 | Lobbett | 269/60 |
| 2,203,162 | 6/1940 | Lee | 269/60 |
| 2,471,940 | 5/1949 | Dion | 408/89 |
| 3,591,303 | 7/1971 | Conway | 408/108 |

Primary Examiner—Leonidas Vlachos
Attorney, Agent, or Firm—Clarence L. Carlson

[57] ABSTRACT

A device for supporting piano hammers for drilling a stem supporting opening therethrough which includes adjusting elements that serve to selectively locate the hammer supporting portion of the device in a preselected position to effect drilling an opening which will extend through the longitudinal axis of a piano hammer and at any desired angle relative to a plane normal with this axis.

6 Claims, 6 Drawing Figures

U.S. Patent  April 25, 1978  Sheet 1 of 2  4,086,017
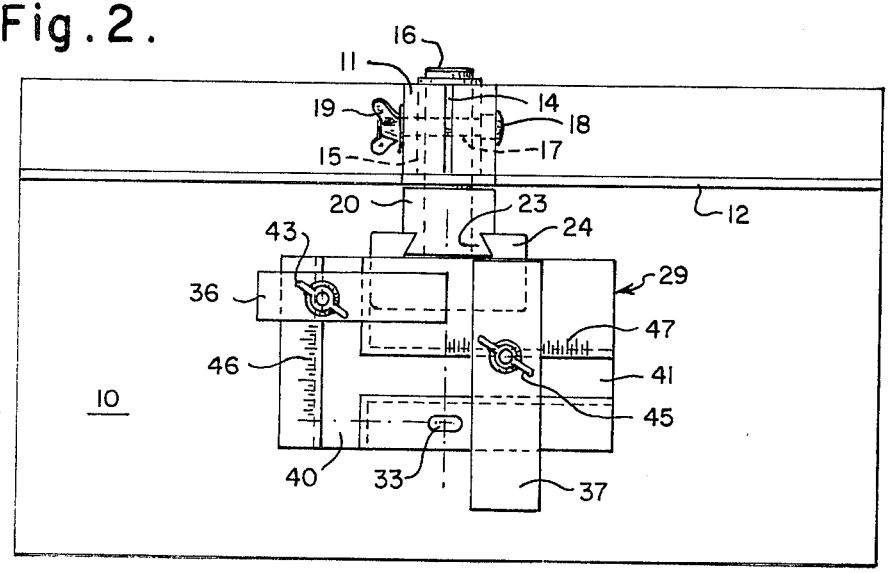
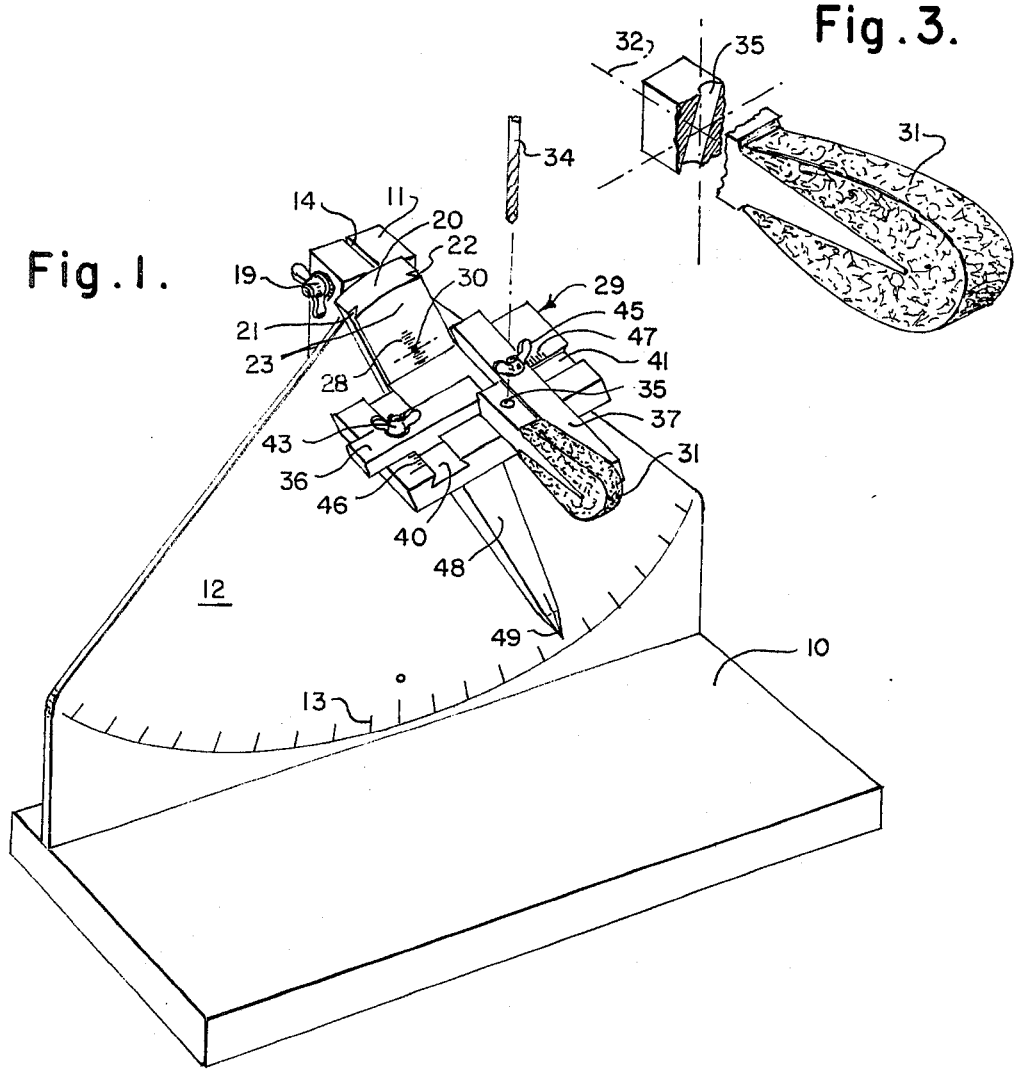

DEVICE FOR LOCATING PIANO HAMMERS FOR DRILLING

BACKGROUND OF THE INVENTION

The invention pertains to a device for supporting piano hammers while drilling a stem supporting opening therein and, more particularly to such a device which can be quickly and easily adjusted to effect the drilling of said opening at the necessary angles required by a particular hammer in its operating position within a piano.

As is well known to those conversant in the art of building and repairing pianos, piano hammers are assembled on the free ends of stem members, and the angle at which hammers are disposed in their operating position relative to their supporting stems varies throughout the length of a piano. For this reason it is necessary during the manufacture of pianos or when replacing broken stems in existing pianos to drill a stem receiving opening through the hammers and at whatever angle a particular hammer may require in its operating position so that its entire striking surface will fully engage those strings with which it is operatively associated.

U.S. Pat. No. 3,591,303 shows and describes an apparatus for positioning piano hammers for drilling which utilizes a vise-like clamp for gripping a hammer and which can be adjusted by tilting so as to drill a stem opening therein at a desired angle.

SUMMARY OF THE INVENTION

The device for locating piano hammers for drilling comprising the present invention includes a selectively rotatable shaft one end of which is journaled in a vertically extending supporting column. The free end of this shaft has a depending bracket fixed thereon which carries a support shelf for supporting a platen on which a piano hammer is placed for drilling. The platen includes selectively positionable stop members for forming a positioning seat for a hammer thereon in alignment with the drill bit of any suitable drilling apparatus. The support shelf is selectively positionable on the depending bracket in a manner whereby the longitudinal axis of a hammer when placed on the platen will be co-axial with the axis of the rotatable shaft. The depending bracket is provided with a lower extension which defines an elongated indicating arm with the lower terminus portion of the latter being disposed in operative association with a fixed arcuated band of indicating indicia. By pivoting the indicating arm to align with any preselected graduation of the indicating indicia will simultaneously turn the rotatable shaft. This movement of the rotatable shaft pivots the support shelf and platen so as to locate the positioning seat for a hammer at that angle corresponding to the preselected position to which the indicating arm was pivoted. With the platen and stop members having been set so that a hammer placed in the positioning seat would have its longitudinal axis co-axial with the axis of the rotatable shaft, causes a stem opening when drilled in said hammer to extend through the latters longitudinal axis regardless of the angular position assumed by said platen when pivoted by selective movement of the indicating arm.

It is a general object of the invention to provide a device for locating piano hammers for drilling stem openings therethrough at any preselected angle required by a hammer's operating position in a piano.

A further object is to provide a device of simplified construction which can be quickly and easily adjusted for locating a piano hammer in any desired angular position for drilling.

A further and more specific object of the invention is to provide a device which regardless of the selected angular position set for positioning and drilling a piano hammer, the stem opening will be formed so as to extend through the longitudinal axis of the hammer.

These and other objects of the invention will become more fully apparent by reference to the appended claims and as the following detailed description proceeds in reference to the figures of drawing wherein:

BRIEF DESCRIPTION OF THE DRAWING

FIG. 1 is a perspective view of the device according to the invention showing a piano hammer in position for drilling;

FIG. 2 is a plan view of the device shown in FIG. 1;

FIG. 3 is a perspective view of a piano hammer with a portion thereof broken away to show a stem opening formed by the device so as to extend through the longitudinal axis of the hammer;

DESCRIPTION OF THE PREFERRED EMBODIMENT

Figure 4:
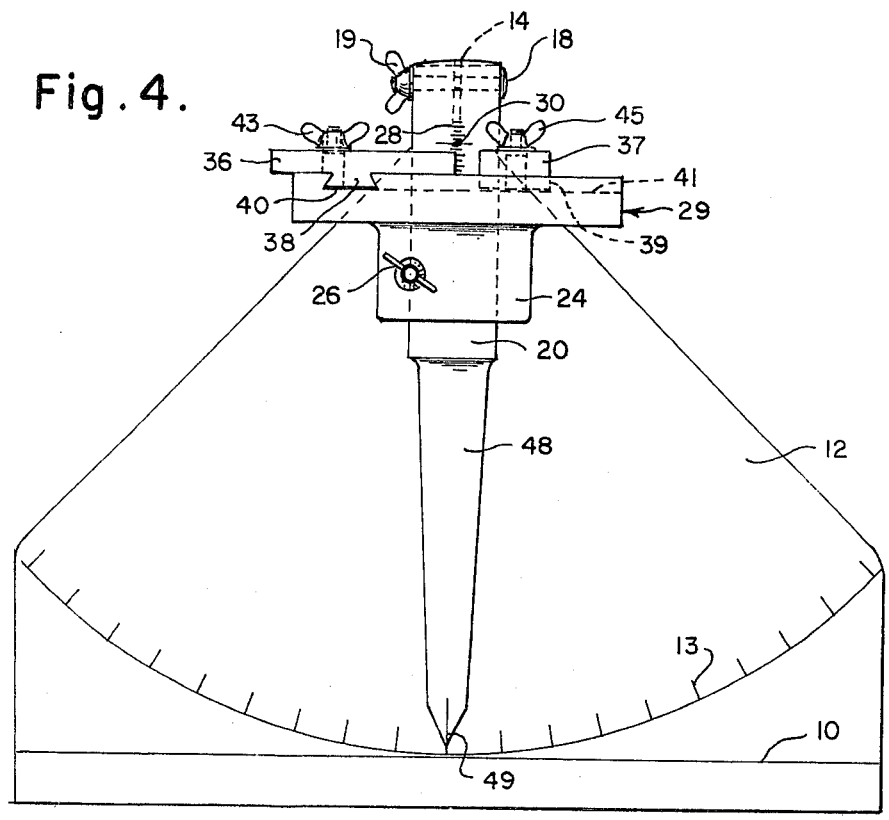
FIG. 4 is a view in front elevation of the device shown in FIG. 1.

Referring now to FIGS. 1, 2, 4 and 5, the numeral 10 identifies a horizontally disposed base for the device which includes a vertically extending supporting column 11 fixed at one side of said base's upper surface. The lower end of a plate member 12 is also attached to the upper surface of the base 10 and extends upwardly from the latter with the central portion thereof being disposed in contiguous relation with the supporting column 11. This plate member 12 is provided adjacent the upper surface of the base 10 with an arcuated band of indicating indicia 13 the purpose of which will be more fully described hereinafter.

As shown in FIGS. 1 and 2 the upper end of the supporting column 11 is bifurcated as at 14 which communicates with an opening 15 within which one end of a selectively rotatable shaft 16 is journaled. An opening 17 formed in the upper end of the supporting column 11 and which traverses the bifurcation 14 has a cross bolt 18 assembled therein with a wing nut 19 assembled on the threaded portion thereof that serves to clamp shaft 16 in a fixed position or release it for selective rotative movement. The purpose for the selective rotative movement of shaft 16 will become obvious as the detailed description of the device proceeds.

Shaft 16 extends from the supporting column 11 in a plane parallel with and spaced from the base 10 and in a direction so as to overlie a portion of said base.

A depending bracket 20 is fixed on that end of shaft 16 which overlies the base 10 and is provided with opposed and longitudinally extending channels 21 and 22 (FIG. 1) which define a dove tail 23. A platen support shelf 24 having one side thereof with a configuration conforming to the dove tail 23 is assembled for selective sliding movement on the latter by means of a dove tail wedge or binder bolt 25 and wing nut 26 (FIG.

5) that may be tightened to fix or loosened to selectively move said shelf.

The depending bracket adjacent its upper end is provided with a band of positioning indicia 28 that extends above and below the axis of shaft 16 and which serves a purpose yet to be described.

A platen generally indicated by numeral 29 is fixed, by any suitable means not shown, to the upper surface of the support shelf 24 and the inner side thereof is disposed in close proximity with the band of positioning indicia 28. As shown in FIGS. 1 and 4 numeral 30 identifies a point in that portion of the positioning indicia 28 that is disposed in alignment with the axis of the selectively rotatable shaft 16. With the graduations of this indicia 28 being located above and below the point 30 provides a means for selectively locating the supporting shelf 24 so that the platen will be in a position when a piano hammer 31 is placed thereon which locates its longitudinal axis 32 (FIG. 3) co-axial with the axis of the shaft 16.

Figure 5:
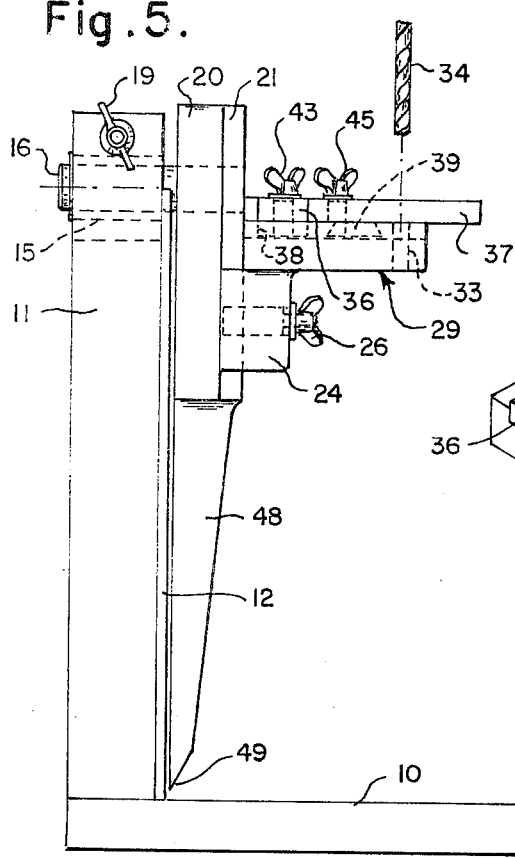
FIG. 5 is a view in side elevation of the device in FIG. 1.
Figure 6:
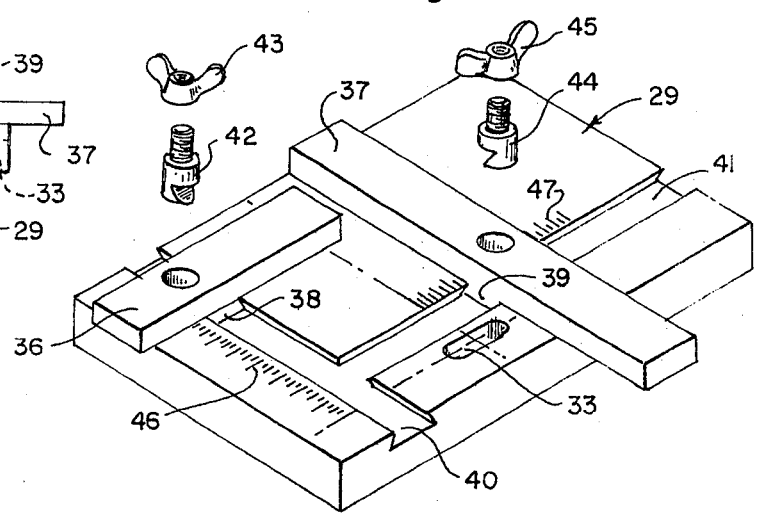
FIG. 6 is a perspective view of the platen for supporting a hammer for drilling showing the selectively positionable stop member for locating said hammer thereon.

As shown in FIGS. 2, 5 and 6 the platen 29 is provided with an elongated or oval shaped opening 33 that is disposed so as to be in vertical alignment with a drill bit 34 that is driven by any suitable drilling apparatus not shown. This opening 33 serves to permit the drill bit 34 to pass through the platen after having been actuated to form a stem supporting opening 35 (FIGS. 1 and 3).

To provide a seat for acurately locating a piano hammer 31 on the platen 29 for drilling, said platen is provided with first and second selectively positionable stop members that are identified by numerals 36 and 37 respectively. Each of these stop members 36 and 37 are provided on its underside with guide lugs of dove tail configuration which are identified by numerals 38 and 39 respectively. As shown in FIG. 6 the upper surface of the platen 29 is provided with a guide channel for each of the stop members 36 and 37 which have a configuration conforming to the shape of the guide lugs 38 and 39 and serve as a means for selective movement of the stop members in the direction that their respective channels extend. Numeral 40 identifies that channel within which guide lug 38 is disposed for guiding the selective movement of stop member 36 and numeral 41 identifies that channel for guide lug 39. As with the supporting shelf 24, each of the stop members 36 and 37 utilizes a binder bolt and wing nut combination identified by numerals 42, 43 and 44, 45 respectively for fixing the position of the stop members at a selected position in correspondence with a band of locating indicia located on the upper surface of the platen in operative association with each channel 40 and 41. The band of locating indicia for channel 40 is depicted by numeral 46 and that for channel 41 by numeral 47.

Referring now to FIGS. 1, 4 and 5 the depending bracket is provided with a lower extension in the form of an elongated indicating arm 48 having a lower terminus portion which defines a pointer 49 disposed in operative association with the arcuated band of indicating indicia 13.

To summarize the operation, the dimension of that end of a piano hammer to be drilled must first be determined after which the support shelf 24 is selectively raised or lowered so as to locate the platen 29 at the required height relative to the axis of the selectively rotatable shaft 16. Wing nut 45 is then loosened to permit the positioning of stop member 37 at location on the platen 29 which when a piano hammer 31 is placed on said platen and in abutting relation with said stop member 37 the longitudinal axis of the hammer will be co-axial with the axis of the selectively rotatable shaft 16. Wing nut 45 is then tightened so as to maintain this position of stop member 37. To drill the stem opening 35 in the required location relative to the length of a hammer, wing nut 43 is loosened and stop member 36 located where desired. Wing nut 43 is then tightened so as to maintain the position of stop member 36 and the combination of both stop members form a seat within which a piano hammer is manually held while drilling a stem supporting opening 35 therethrough.

With the platen and stop members pre-set in the manner described supra, the entire combination can be pivoted to any desired position which permits the drilling of a stem supporting opening 35 in a piano hammer at an angle while maintaining the longitudinal axis thereof co-axial with the axis of the selectively rotatable shaft 16. To pivot the platen and stop members carried thereon, one simply has to loosen wing nut 19 and swing the elongated indicating arm 48 so that the pointer 29 thereof aligns with that graduation on the arcuated band of indicating indicia 13 which corresponds to the particular angle at which it is desired to drill the stem supporting opening 35.

It can be easily seen and understood from the detailed description and drawings that the device is readily adaptable for drilling workpieces other than piano hammers.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A device for positioning piano hammers for drilling an opening to receive a supporting stem which extends through the longitudinal axis of the piano hammer and at a preselected angle relative to a plane normal to the longitudinal axis, said device comprising:
   (a) a support assembly including;
      (i) a horizontal base;
      (ii) a supporting column extending upwardly from said base; and
      (iii) a vertically disposed plate member extending from said base in contiguous relation with said supporting column;
   (b) a selectively rotatable shaft journaled in said supporting column and extending from the latter in a plane parallel with and spaced from said base;
   (c) supporting means fixed on said rotatable shaft and supporting a platen support shelf on which a piano hammer is positioned for drilling;
   (d) said supporting means including;
      (i) means for selectively raising and lowering said platen support shelf thereon for locating the longitudinal axis of a hammer to be drilled co-axial with the axis of said rotatable shaft; and
      (ii) means for rotating said rotatable shaft to pivot said platen support shelf to a predetermined position while maintaining the longitudinal axis of the hammer co-axial with said shaft to effect drilling an opening through the hammer at an angle.

2. The device according to claim 1 wherein said supporting means defines a depending bracket having said platen support shelf mounted for selective sliding movement thereon.

3. The device according to claim 2 wherein said raising and lowering means defines opposed and longitudinally extending channels in said bracket for receiving one end of said platen support shelf of conforming configuration.

4. The device according to claim 2 wherein said rotating means defines an elongated indicating arm forming a lower extension of said depending bracket with the lower terminus portion of said arm being disposed in operative association with an arcuated band of indicating indicia disposed on the face of said plate member for selectively locating said arm to effect pivoting said platen to a desired position.

5. The device according to claim 3 wherein said platen support shelf is disposed in operative association with positioning indicia carried by said depending bracket and includes locking means for its selective positioning at any desired location within said channels in accordance with said positioning indicia for locating the longitudinal axis of a piano hammer co-axial with said rotatable shaft.

6. The device according to claim 1 wherein said platen includes first and second selectively positionable stop members and locating indicia operatively associated with each said stop members to provide a positioning seat thereon to locate a piano hammer for drilling.

* * * * *